March 26, 1963 W. P. COLISTRA ETAL 3,082,539
SYNCHRONIZATION MEANS FOR GYROMAGNETIC COMPASS SYSTEMS
Filed March 14, 1961
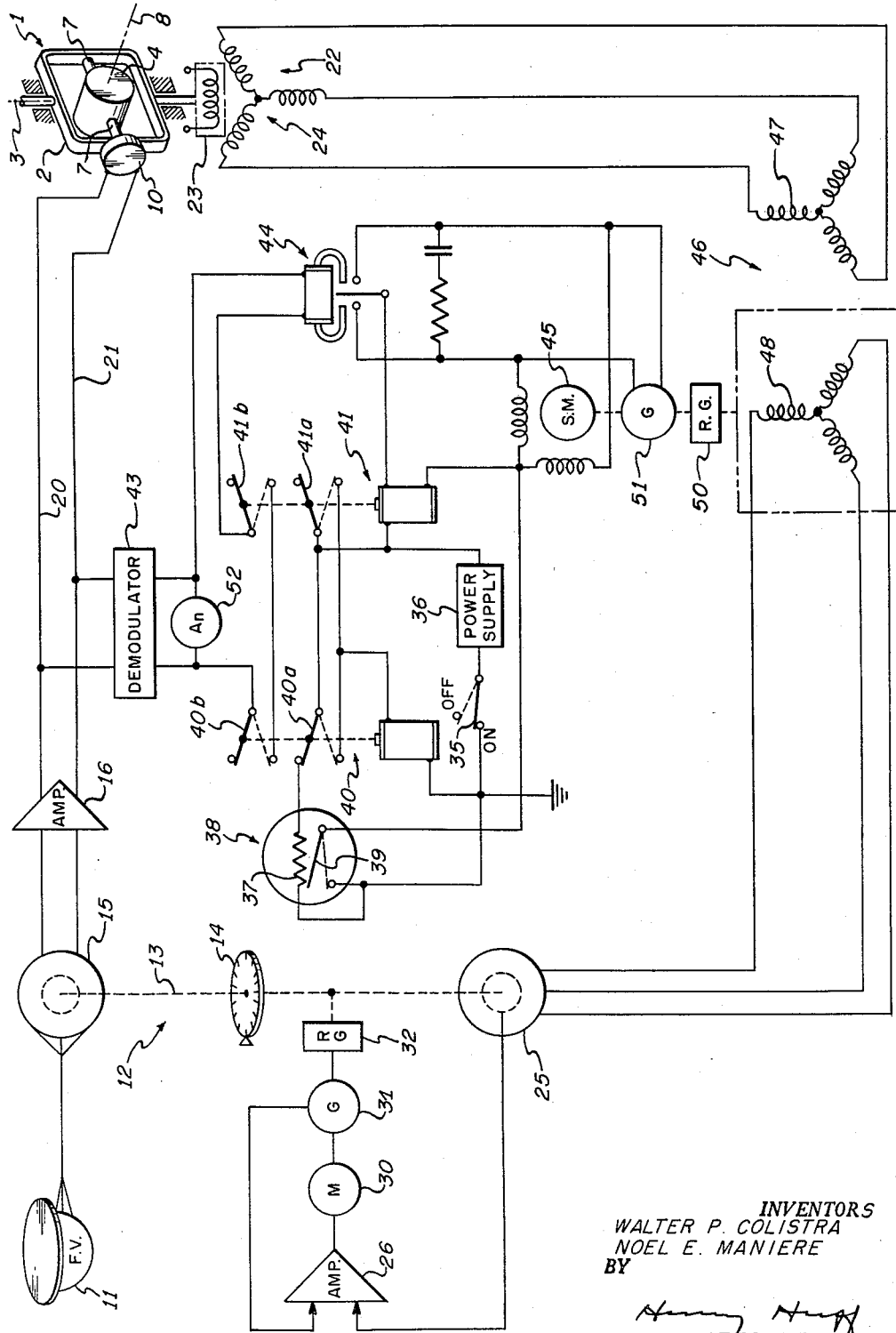
INVENTORS
WALTER P. COLISTRA
NOEL E. MANIERE
BY
ATTORNEY

United States Patent Office 3,082,539
Patented Mar. 26, 1963

3,082,539
SYNCHRONIZATION MEANS FOR GYROMAGNETIC COMPASS SYSTEMS
Walter P. Colistra, Huntington Station, and Noel E. Maniere, Bronx, N.Y., assignors to Sperry Rand Corporation, Great Neck, N.Y., a corporation of Delaware
Filed Mar. 14, 1961, Ser. No. 95,734
4 Claims. (Cl. 33—222)

This invention relates to gyromagnetic compass systems wherein a directional gyro is slaved to a magnetic compass and particularly to means for quickly synchronizing the system when it is initially activated.

In gyromagnetic compass systems, the directional gyroscope is normally arranged to slowly follow the horizontal component of the earth's magnetic field as detected by a magnetic compass such as a flux valve. This slow following characteristic has the disadvantage that when the system is initially activated the heading indicated by the system may be in error from the proper magnetic heading by a considerable angle. A considerable delay may occur before the slowly precessed gyroscope has caused the system to indicate the direction commanded by the magnetic compass.

Prior art devices overcome this delay by utilizing a higher than normal current applied to the torque motor of the gyroscope for rapidly precessing the gyroscope during start up. A time delay is usually used to control the time interval during which the increased current is applied to the torque motor. The disadvantage of this system is that if the time delay device or its associated circuitry fails, the high starting current is applied to the torque motor for an excessive period of time thereby causing damage to the torque motor and/or the gyroscope.

Another prior art approach is disclosed in U.S. Patent 2,898,690 issued August 11, 1959 to W. P. Colistra entitled, "Quick Setting Means for Gyromagnetic Compass." This patent discloses means for bringing the heading indicated by the system quickly into alignment with the heading demanded by the magnetic compass when the system is first switched on by disconnecting the torque motor of the directional gyroscope and applying the signal from the flux valve to drive the compass card and all other elements associated therewith directly. After a predetermined time interval established by the warm-up time of thermal time delay devices, the system is switched back to normal mode of operation with the flux valve connected to the torque motor of the directional gyroscope. The disadvantages of this system includes the directional gyroscope being disconnected and thereby not providing continuous stabilization and in the event the time delay device fails the directional gyroscope remains disconnected. The present invention is an improvement over the above described prior art systems.

It is a primary object of the present invention to provide automatic means for bringing the heading indicated by the system rapidly into alignment with the heading demanded by the magnetic compass when the system is initially activated by auxiliary means while maintaining the magnetic compass and the directional gyroscope continuously coupled.

It is an additional object of the present invention to provide automatic means for bringing the heading indicated by the system rapidly into alignment with the heading demanded by the magnetic compass when the system is initially activated by means of a primary servo loop and a normally ineffective auxiliary servo loop both of which simultaneously tend to synchronize the system during a predetermined time interval.

It is another object of the present invention to provide automatic means for synchronizing a gyromagnetic compass system which utilizes the cool-down time interval of a thermally responsive device to thereby render the system fail-safe.

Other objects and advantages of the present invention will become apparent from the following description and accompanying drawing which is a schematic diagram of a gyromagnetic compass system incorporating the present invention.

Referring now to the drawing, a slaved directional gyroscope 1 is shown having a vertical ring 2 mounted for freedom about a normally vertical axis 3 on the craft. The gyro 1 includes a rotor case 4 journalled on horizontal trunnions 7, 7 in the vertical ring 2. The rotor (not shown) of the gyro 1 is mounted for spinning about a spin axis 8 normally maintained level by an erection system (not shown). The gyro 1 is normally slaved by means of a torque motor 10 which exerts a torque about the horizontal axis of the gyro 1 causing it to precess in azimuth at a slow rate whenever the position of the directional gyro 1 is in error with respect to the position demanded by the magnetic compass or flux valve 11.

Interposed between the flux valve 11 and the directional gyroscope 1 is a master indicating device 12 having a rotatable shaft 13, the position of which is normally maintained aligned with respect to the magnetic meridian from the output of the gyro 1 as supervised by the flux valve 11 in a manner to be explained. A compass card 14 may be fixed to the shaft 17 for providing a visual indication of the heading of the craft. Errors in the deviation of the position of the shaft 13 with respect to the magnetic meridian are detected by a flux valve synchro control transformer 15 which has its rotor connected to the shaft 13 and its stator connected to the flux valve 11. By having the rotor of the synchro 15 connected to an input terminal of a slaving amplifier 16 and by having the output terminals 20 and 21 of the slaving amplifier 16 connected to the torque motor 10, the error signal representative of the difference between the horizontal component of the earth's magnetic field as sensed by the flux valve 11 and the position of the shaft 13 is applied to the torque motor 10 to precess the directional gyro 1 in a direction to eliminate the error signal in a conventional manner.

In a conventional gyromagnetic compass system of the type disclosed in the aforementioned U.S. Patent 2,898,690, the position of the shaft 13 is controlled in accordance with the position of the directional gyro 1 by a synchro data transmission system including a synchro transmitter 22 having its rotor 23 connected to the vertical axis 3 of the vertical ring 2 of the gyro 1 and a control transformer 25 having its stator connected to the corresponding windings of the stator 24 of the synchro transmitter 22. The rotor of the control transformer 25 is mounted on the rotatable shaft 13 in order that whenever the position of the rotor winding of the control transformer 25 varies from its null position with respect to the rotor winding 23 of the synchro transmitter 22, a reversible phase variable amplitude signal is generated which is connected to a phase sensitive amplifier 26 to drive a servomotor 30. The output shaft of the servomotor 30 is connected to a tachometer generator 31 which provides a rate feedback signal for stabilization purposes and it is also connected through reduction gearing 32 to rotate the shaft 13 in a direction to reduce the signals to zero. It will be understood that additional signals may be generated from the above system representative of the position of the shaft 13 for controlling compass repeaters and automatic pilots as disclosed in the aforementioned U.S. Patent 2,898,690.

The above system as described, is a conventional gyromagnetic compass system and may for purposes of explanation of the present invention be considered a primary servo loop which operates continuously to eliminate any error between the flux valve 11, the directional gyro 1 and the shaft 13. By means of the present invention an auxiliary servo loop is added which is normally ineffective but which is used for rapidly synchronizing the primary servo loop when the system is initially activated. By means of the present invention the human pilot is freed from the necessity of aligning the system with the meridian or of having to operate successively a plurality of synchronizing switches. This is accomplished by initiating a synchronizing cycle which is brought into action automatically by the initial activation of the system and requires no further operation or special observation by the pilot. Further, by utilizing the cooling-off time of a thermally responsive relay in a manner to be explained, the system is fail-safe.

In the following description the contact arms are shown in solid lines in the normal mode of operation. A system master activate switch 35 when closed as shown in solid lines connects a power supply 36 to the heater coil 37 of a thermal relay 38, and with the contact arm 40a of a relay 40 in its uppermost position as shown the thermal relay 38 is energized. After a time interval, for example 9 seconds, when the heater coil 37 has warmed up sufficiently, the contact arm 39 of the thermal relay 38 is switched to its closed position as shown in dotted lines thereby energizing a relay 41. This results in the contact arms 41a and 41b of the relay 41 being pulled down to their lowermost position as shown in dotted lines resulting in energizing relay 40 which causes the contact arms 40a and 40b of the relay 40 to be pulled down to their lowermost positions as shown in dotted lines. This results in (1) rendering the auxiliary servo loop responsive to the error signal from the slaving amplifier 16 in a manner to be explained, (2) disconnecting the current from the heater coil 37 of the thermal relay 38 and (3) causing the relay 40 to lock itself in. The auxiliary servo loop is now in its effective mode of operation and will remain so for the cool-off time interval of the thermal relay 38, i.e. until its contact arm 39 snaps to the open position as shown in solid lines which requires a predetermined time delay, for example 30 seconds.

The auxiliary servo loop of the present invention includes a demodulator 43 connected to the output terminals 20, 21 of the slaving amplifier 16, a polarity sensitive relay 44 connected through the contact arms 40b and 41b to the demodulator 43, a servomotor 45 connected to the relay 44, and a differential synchro 46 interposed between the synchro transmitter 22 and the control transformer 25. The stator windings 24 of the synchro transmitter 22 are connected to the corresponding stator windings 47 of the differential synchro 46 while the rotor windings 48 of the differential synchro 46 are connected to the stator windings of the control transformer 25. The output shaft of the servomotor 45 is connected to drive the rotor windings 48 through a reduction gearing 50. For stabilization purposes the output shaft of the servomotor 45 also drives a tachometer generator 51 which provides a rate feedback signal to the input terminals of the servomotor 45. An annunciator 52 provides a visual indication of whether or not the system is synchronized.

During the time that the contact arm 39 is in its closed position as shown in dotted lines and the relays 40 and 41 are energized which as explained above is shortly after the system is activated by the switch 35, the servomotor 45 is responsive to the error signal from the slaving amplifier 16 and rapidly rotates the rotor 48 of the differential synchro 46 in a direction to synchronize the primary servo loop and the overall system. The primary servo loop through the directional gyro 1 is itself continuously tending to slowly synchronize in order that both the auxiliary and the primary servo loops tend to synchronize the system simultaneously. After a time interval has elapsed during which the system is synchronized, for example 30 seconds, the thermal relay 38 is cooled-off sufficiently that the contact arm 39 goes to its open position as shown in solid lines. This deenergizes the relay 41 thereby causing its contact arms 41a and 41b to return to their upward position which renders the relay 44 unresponsive to the output signal of the slaving amplifier 16. Thus, the auxiliary servo loop is again in its normal mode of operation, i.e. ineffective.

The primary servo loop continues to operate in a normal manner by slowly slaving the gyro 1 in accordance with the signals from the flux valve 11 in order to maintain the shaft 13 aligned with the signal from the flux valve 11 in a conventional manner.

It will be noted that during the time that the auxiliary servo loop is rendered effective by the thermal relay 38 both the primary and the auxiliary servo loops are simultaneously effective in eliminating the error signals in the system to thereby synchronize the system. It will also be noted that the failure of any of the relays 38, 40 or 41 will not effect the normal operation of the system since only the auxiliary servo loop will be effected and the primary servo loop will continue to operate in a normal manner. Recycling of the system is accomplished by placing the master switch 35 in the off position as shown in dotted lines. This causes the relay 40 to become deenergized and the synchronizing cycle described above is then ready to begin again. By this feature the system can be recycled in flight in the event it is desired for some reason to synchronize the system.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a gyromagnetic compass system, a primary servo loop including a directional gyroscope, a magnetic compass, and means for slowly slaving said gyroscope from said compass for eliminating any error therebetween, a normally ineffective auxiliary servo loop normally unresponsive to said error for rapidly synchronizing said primary loop when said system is initially activated, and thermally responsive means responsive to the activation of said system and connected to said auxiliary servo loop for rendering said auxiliary servo loop responsive to said error and thereby effective to eliminate said error during the cooling-off time interval of said thermally responsive means.

2. An automatic fast synchronizing arrangement for a gyromagnetic compass system comprising a directional gyroscope, a magnetic compass, means for slowly slaving said gyroscope to said compass in accordance with an error signal representative of the difference between the signal from said compass and that from said gyroscope, normally ineffective auxiliary means normally unresponsive to said error signal for rapidly synchronizing the signal from said gyroscope to the signal from said compass, said auxiliary means including differential signal generating means interposed between said gyroscope and said compass, and means including thermal time delay means responsive to activation of said system for rendering said auxiliary means effective to eliminate said error signal during the cooling-off time interval of said thermal time delay means.

3. An arrangement as described in claim 2 wherein said auxiliary means is connected in parallel with respect to said compass and said gyroscope slaving circuit.

4. An automatic fast synchronizing arrangement for a gyromagnetic compass system comprising a flux valve, a flux valve synchro having a stator and a rotor with its stator connected to said flux valve, a slaving amplifier connected to said flux valve synchro, a directional gyro having its torque motor connected to said slaving amplifier for slaving said gyroscope to said flux valve, a heading synchro having a stator and a rotor with its rotor connected to said gyroscope for providing a signal representative of the position thereof, a differential synchro having a stator and a rotor with its stator connected to the stator of said heading synchro, a control transformer having a stator and a rotor with its stator connected to the rotor of said differential synchro, the rotor of said control transformer and the rotor of said flux valve synchro being mechanically connected together, servomotor means responsive to the control transformer for rotating the rotors of said control transformer and said flux valve synchro to reduce their error signals to zero, auxiliary servomotor means selectively connected to said slaving amplifier for driving the rotor of said differential synchro in a direction to rapidly synchronize said system, and means including time delay means responsive to the activation of said system for connecting said servomotor means to said slaving amplifier only during a predetermined time interval defined by said time delay means.

References Cited in the file of this patent

UNITED STATES PATENTS

| | | |
|---|---|---|
| 2,140,191 | Schuchardt et al. | Dec. 13, 1938 |
| 2,561,367 | Haskins | July 24, 1951 |
| 2,611,190 | MacCallum et al. | Sept. 23, 1952 |
| 2,647,233 | Kutzler | July 28, 1953 |
| 2,855,558 | Fragola | Oct. 7, 1958 |
| 2,887,782 | Garwood | May 26, 1959 |
| 2,898,690 | Colistra | Aug. 11, 1959 |

FOREIGN PATENTS

| | | |
|---|---|---|
| 980,823 | France | Jan. 3, 1953 |
| 711,078 | Great Britain | June 23, 1954 |